Aug. 28, 1962  F. S. PEARNE  3,051,224
BEAD BREAKER
Filed Jan. 5, 1960  4 Sheets-Sheet 1

INVENTOR.
FRANK S. PEARNE
BY Ely Pearne
& Gordon
ATTORNEYS.

INVENTOR.
FRANK S. PEARNE

Aug. 28, 1962   F. S. PEARNE   3,051,224
BEAD BREAKER

Filed Jan. 5, 1960   4 Sheets-Sheet 3

INVENTOR.
FRANK S. PEARNE
BY Ely, Pearne
& Gordon
ATTORNEYS.

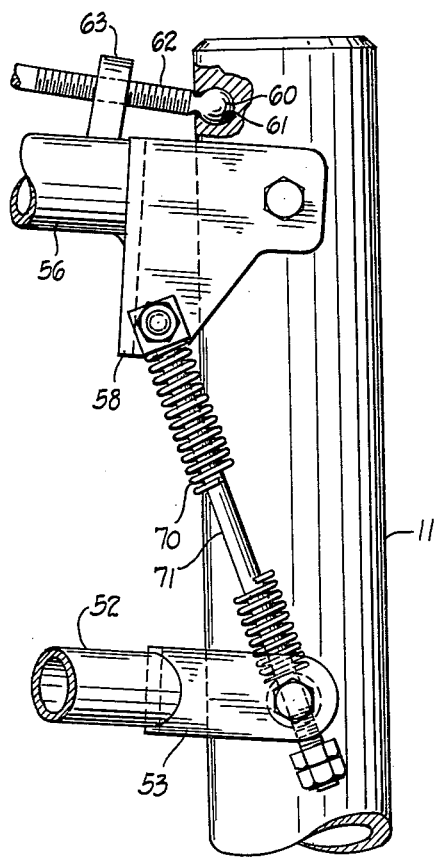
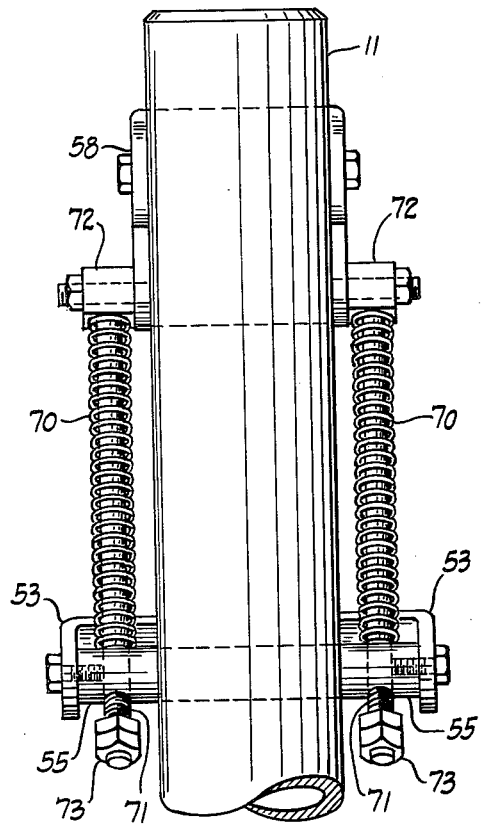
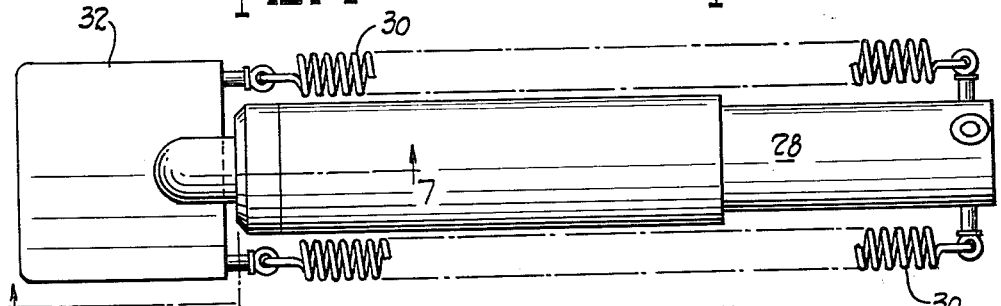
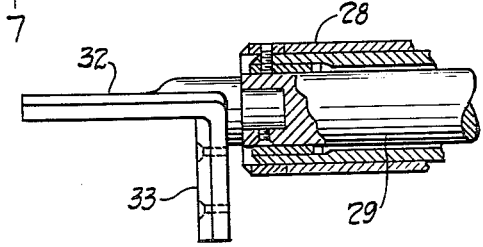

United States Patent Office 3,051,224
Patented Aug. 28, 1962

3,051,224
BEAD BREAKER
Frank S. Pearne, Alhambra, Calif., assignor to Regent Jack Mfg. Co., Inc., Downey, Calif., a corporation of California
Filed Jan. 5, 1960, Ser. No. 644
8 Claims. (Cl. 157—1.28)

This invention relates generally to bead breakers, and, more particularly, to an apparatus for breaking loose the beads of pneumatic tire casings from the rims on which the casings are mounted.

The apparatus of the invention is of the general type described in my U.S. Patent No. 2,753,924, in which a base frame is provided for supporting a wheel in a vertical position, and which further includes a pair of opposed pressure rams for engaging the tire to break the beads away from the rim. While my prior apparatus is effective to handle pneumatic tired wheels of moderate sizes, the structural arrangement in which the pressure rams are rotatably connected directly to the base frame at a low elevation prevents the apparaus from effectively handling massive wheels of relatively large diameters such as aircraft wheels frequently in use on large civilian and military aircraft.

The present invention overcomes this problem by incorporating the pressure rams into a head assembly which is positioned well above the base frame. This head assembly is mounted for sufficient vertical movement toward and away from the base frame so that the apparatus can effectively accommodate wheels of various diameters while engaging the tire above, instead of below, the wheel axis. This provides effective lateral support for the tire and wheel assembly during the bead breaking operation.

Inasmuch as the head assembly is of substantial weight, I have included in my invention a unique counterbalance system which functions to balance the head assembly in every position in which it may be set. As a result of this novel construction, a bead breaker embodying the invention can be operated with little effort, and is at the same time effective to break away the beads of relatively large tire casings.

Accordingly, an object of the present invention is to provide a bead breaker which can accommodate relatively large wheels such as aircraft wheels and will provide lateral support to hold the tire and wheel assembly against falling sideways during the bead breaking operation.

Another object is to provide a bead breaker having an adjustable head assembly including opposed pressure rams, the head assembly being adjustable to different positions so that the apparatus can accommodate wheels having a wide range of sizes.

Still another object is to provide a bead breaker such as described in the previous paragraph with a unique counterbalance system which is effective to balance the head assembly in any position in which it may be set.

Other objects of the invention include the provision of a bead breaker which is inexpensive to manufacture and easy to operate and, yet, is amply rugged and powerful for the heavy service for which it is intended.

Other objects and attendant advantages of the invention will become apparent as the same become better understood when considered in connection with the following detailed description and the accompanying drawings wherein:

FIGURE 4 is a side elevation of a fragment of the apparatus.

FIGURE 5 is a rear elevation of the fragmentary section shown in FIG. 4.

FIGURE 6 is a top view of one of the pressure actuated rams.

FIGURE 7 is a sectional view taken along the line 7—7 of FIG. 6.

Figure 1:
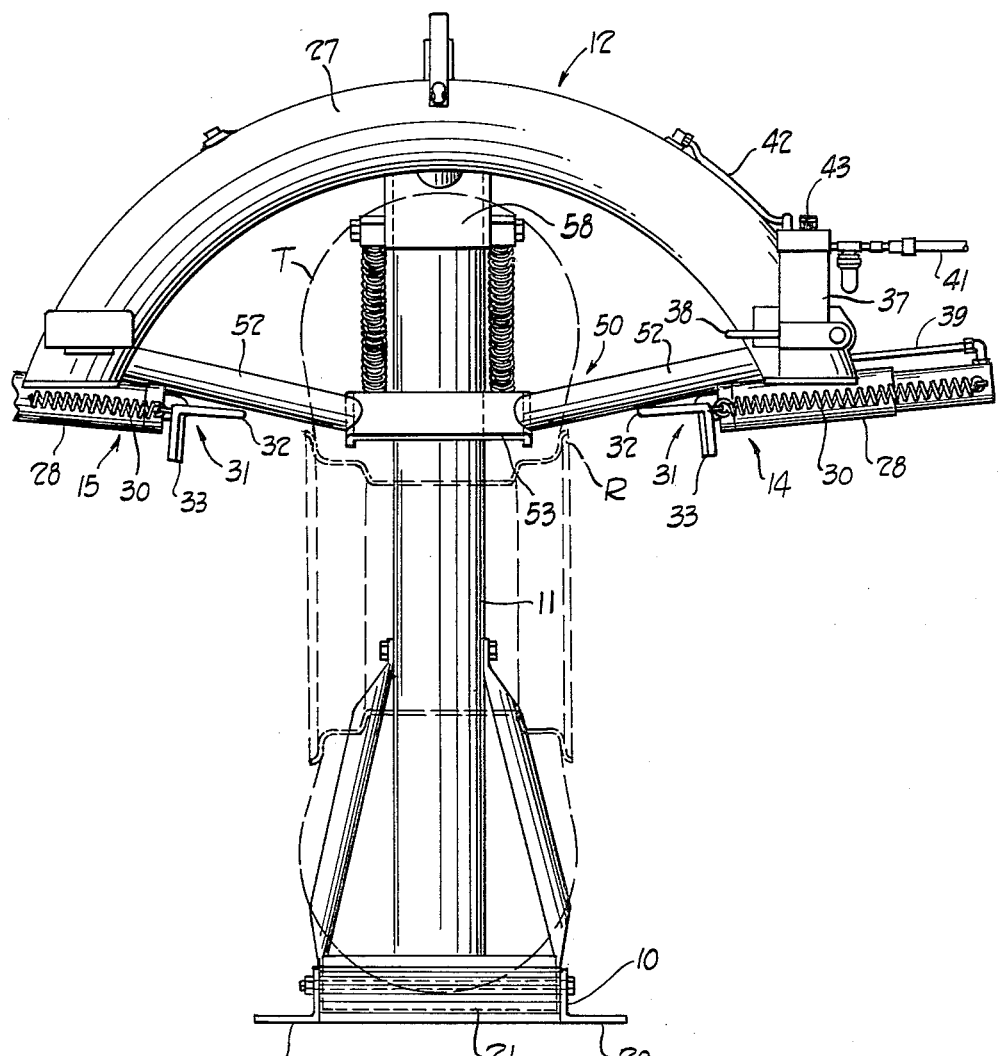
FIGURE 1 is a front elevation of a bead breaker embodying the invention.
Figure 2:
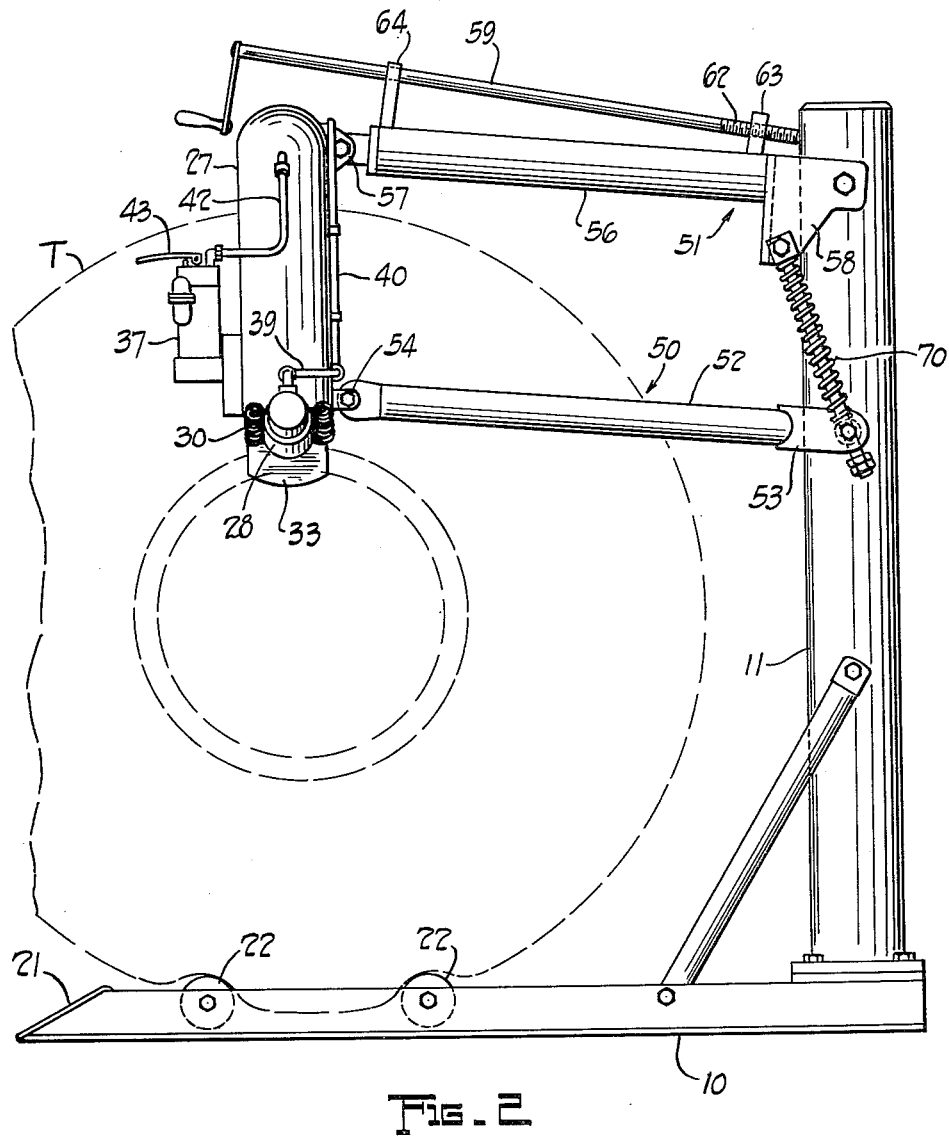
FIGURES 2 and 3 are side and top elevations, respectively, of the apparatus shown in FIG. 1.
Figure 3:
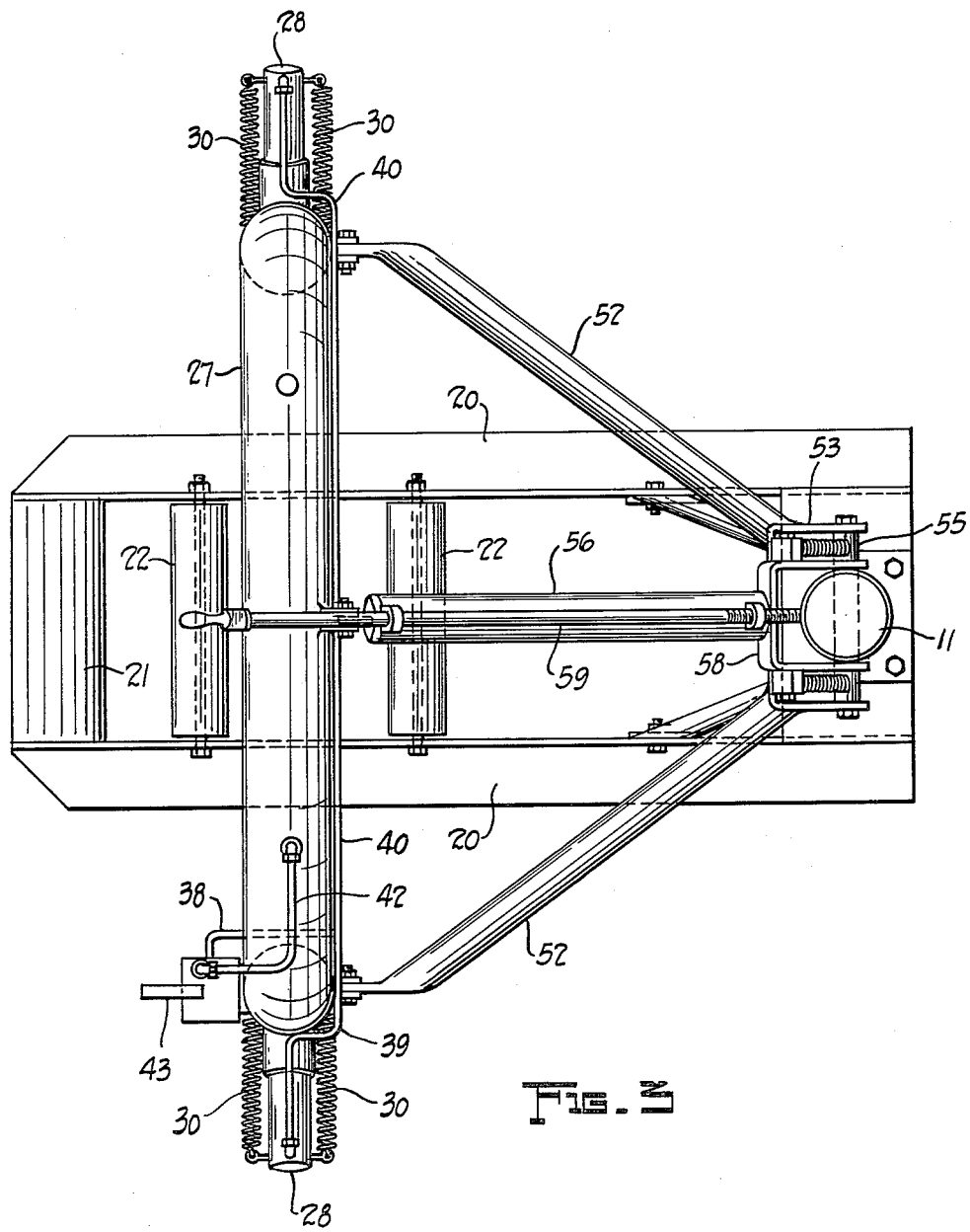

Referring now to the drawings, and to FIGS. 1, 2 and 3 in particular, there is shown a bead breaker apparatus which is especially adapted to handle large aircraft tires. This apparatus is comprised generally of a base 10, a post 11 and a head assembly 12 carried by the post. The head assembly 12 includes opposed, fluid actuated ram means 14 and 15 which function to engage opposite sides of the tire T to break the bead away from the rim R.

The base 10 is formed from spaced parallel rails 20 which are connected at their front and rear ends. The forward ends of the rails slope inwardly and upwardly and are connected by a transverse plate 21 that has a corresponding slope to form a ramp, while a plurality of transverse rollers 22 extend between the rails at intermediate points along the length of the base. The ramp plate 21 and the rollers 22 functionally co-operate to permit a wheel and tire assembly to be rolled into operative position between the rams 14 and 15 without the necessity of having to lift the heavy tire assembly. As shown, the post 11 is secured between the rear ends of rails 20.

In the illustrated embodiment, the head assembly 12 is shown as including an hydraulic fluid reservoir 27 which is in the form of an arcuate tube having downwardly curved ends. On these ends are located the ram means 14 and 15. Each ram is comprised of a cylinder 28 which is fixed to the reservoir 27, and a piston rod 29. For the purposes of illustration, the cylinders have been indicated as being one-way, fluid-actuated cylinders, provided with springs 30 for retracting the piston rods. However, it is apparent that double-acting cylinders could be used, and that they could be pneumatically actuated rather than hydraulically actuated.

Reference number 31 indicates bead engaging shovel members, one being secured to each piston rod 29. The shovel members 31 are generally L-shaped plates having a horizontal leg 32 which contacts the tire, and a depending leg 33 which is adapted to contact the rim of the wheel and to thus serve as a stop to prevent pinching of the tire.

The actuating mechanism for the rams includes a conventional pneumatic pump 37 which is secured to the reservoir 27 adjacent the ram means 14. This pump draws fluid from the reservoir and then forces it through conduit 38 and through conduits 39 and 40 to the cylinders 28. An air line 41, leading from a suitable air supply (not shown) is connected to the pump 37 to actuate the same, and to the reservoir through conduit 42 for the purpose of pressurizing the reservoir to assist in feeding the pump. A manually actuatable handle 43 is provided on the pump 37 so that it can be operated at desired intervals.

The reservoir 27 and ram means 14 and 15 are mounted for substantially straight line vertical movement with respect to the post 11 so that these parts can be adjustably positioned to break loose the beads on wheels of varying diameters. This mounting means comprises a lower cantilever arm assembly 50 and an upper cantilever arm assembly 51 which extend from the post so as to position the attached reservoir and ram means well above a point that is substantially midway between the rollers 22.

As shown, the lower arm assembly 50 consists of a pair of arms 52 which are rigidly fastened at one end to a yoke 53 and diverge toward their other ends, which are pivotally connected at points 54, 54 to opposite ends of the reservoir 27. The legs of the yoke 53 are connected to the ends of a shaft 55 which is rotatably journalled in the post 11 and which extends beyond opposite sides thereof. The upper arm assembly 51 includes an arm 56 which lies in a plane parallel to the plane of the lower arm assembly. One end of the arm 56 is pivotally connected at 57 to the center of the tubular reservoir 27, and the other end of the arm 56 is rigidly joined to a yoke 58. The legs of this yoke are pivotally connected to the post 11 on opposite sides thereof. As is most clearly apparent in FIG. 2, movement of the head structure 12 will be accomplished by parallel movement of the lower and upper arm assemblies 50 and 51, respectively, which comprise a parallel motion, cantilever mounting means for supporting the head structure for substantially straight line vertical movement.

Movement of the head structure 12 is effectuated by a crank arm 59 which is carried by the upper arm assembly 51. This crank arm has a ball-shaped end 60 which is fitted into a socket 61 formed in the post 11, and has a threaded portion 62 which is threaded thorugh a bracket 63 rigidly secured to the arm 56 adjacent the post 11. The crank arm is further supported by a collar 64 rigidly secured to the arm 56 adjacent the reservoir 27. Rotation of the crank arm and the consequent relative movement between the arm and the threaded bracket 64 serve to move the free end of the upper arm assembly up or down depending upon the direction of rotation.

The weight of the head assembly 12 is effectively counterbalanced in any position by a pair of springs 70 which are interconnected under compression between the arm assemblies 50 and 51. Each of these springs is carried by a pin 71, one end of which is connected to a collar 72 rotatably carried by a leg of the yoke 58, and the other end of which is slidably received in a hole through the shaft 55. Bolts 73 are threaded into one end of the pins 71 to prevent them from sliding out of the shaft 55 and for varying the force exerted by the springs 70.

Referring specifically to FIGS. 2 and 4, it will be seen that the yoke 58 constitutes a lever arm through which the compressive forces of the springs 70 act on the upper arm assembly 51. When the head structure 12 is lowered from the position shown in FIGS. 2 and 4, the effective length of this lever arm decreases as the pins 71 slide through the rod 55 and the spring 70 approach vertical alignment with the post 11. At the same time, the springs 70 are progressively compressed so they will exert an increasing force which opposes further counterclockwise movement of the head structure. The variable force exerted by the springs 70 and the variable length of the lever arm through which the springs act are such that the weight of the head assembly will be very nearly counterbalanced regardless of its position.

In operation, an aircraft wheel and tire or the like is rolled up the ramp 21 and onto the rollers 22. When thus positioned, the vertical center line of the wheel will be between the opposed ram means 14 and 15. The crank arm 59 is then rotated to lower the head assembly to a point where the opposed legs 32 of the shovel members straddle the tire and are in alignment with the bead of the tire T, as shown in FIG. 1. It will be noted that because of the spaced parallel arrangement of the cantilever arm assemblies 50 and 51 the tire engaging legs 32 of the shovel members will always be substantially horizontal and substantially in alignment with the vertical center line of the wheel so as to be properly oriented without rotative adjustment of the shovel members. The shovel members are also positioned close to the tire on opposite sides thereof at sufficient height to effectively support the heavy wheel and tire against falling sideways. Following the positioning of the head assembly, the pump is actuated by means of the handle 43 to extend the shovels into contact with the tire thereby breaking loose the bead, the springs 30 serving to retract the shovels at the end of their operative stroke. The tire may be then rotated on the rollers 22 to a new position and the operation repeated.

It is to be understood, of course, that the foregoing disclosure relates to only a preferred embodiment of the invention and that numerous modifications or alterations may be made therein without departing from the spirit and scope of the invention as defined by the appended claims.

What is claimed is:

1. A bead breaker comprising a base; means on said base for rotatably supporting a tire and wheel in a vertical plane; a head assembly including an inverted U-shaped frame for straddling a tire and opposed pressure rams respectively mounted on depending ends of said frame; and means on said base supporting said head assembly above a wheel and tire supported on the base as aforesaid for vertical adjustment of the head assembly downwardly into and upwardly out of straddling relationship with the tire, said mounting means including structure restraining movement of the head assembly transversely of said vertical plane in all positions of adjustment.

2. A bead breaker comprising a base; means on said base for rotatably supporting a tire and wheel in a vertical plane; a post mounted on said base; a head assembly including an inverted U-shaped frame for straddling a tire, opposed pressure rams respectively mounted on depending ends of said frame, and means for actuating said rams; and cantilever means mounted on said post well above the level of said tire supporting means for supporting said head assembly above a tire and wheel supported on the base as aforesaid, said cantilever means including structure restraining said head assembly against movement transversely of said vertical plane and mechanism for adjusting the vertical height of said head assembly while so restrained.

3. A bead breaker comprising a base; means on said base for rotatably supporting a tire and wheel in a vertical plane; a post mounted on said base; a head assembly including an inverted U-shaped frame for straddling a tire, opposed pressure rams respectively mounted on depending ends of said frame, and means for actuating said ram; cantilever means mounted on said post well above the level of said tire supporting means for supporting said head assembly above a tire and wheel supported on the base as aforesaid, said cantilever means including structure restraining said head assembly against movement transversely of said vertical plane and mechanism for adjusting the vertical height of said head assembly while so restrained; and counter-balancing means exerting a substantially uniform force opposing the weight of said head assembly over its range of adjusting movement.

4. A bead breaker comprising a base, rollers on said base for rotatably receiving and supporting a tire and wheel in a vertical plane; a post fixed to said base; a head assembly disposed well above a point between said rollers, said head assembly comprising opposed pressure rams, and means for actuating said rams; connecting means between said head assembly and said post, said connecting means comprising upper and lower arm assemblies pivotally connected to said post well above the level of said rollers and to said head assembly, said arm assemblies being arranged in spaced, parallel planes so that the head assembly can be moved in substantially a vertical direction; means connected to said upper arm assembly and to said post for moving said head assembly in a vertical direction; and a counterbalance for said head assembly, said counterbalance comprising a shaft journalled in said post below said upper arm assembly, a spring pin having one end connected to said upper arm assembly and having its other end slidably received in a hole in said shaft, and a compression spring surrounding said pin, said compression spring having one end abutting said upper arm assembly and having its other end abutting said shaft so that the head assembly will be balanced in any position in which it is set.

5. A bead breaker comprising a base, rollers on said base for rotatably receiving and supporting a tire and wheel in a vertical plane; a post fixed to said base; a head assembly disposed well above a point between said rollers, said head assembly comprising opposed rams, means for actuating said rams, connecting means between said head assembly and said post, said connecting means comprising upper and lower arm assemblies, said upper arm assembly being pivotally connected to said post well above the lever of said rollers and to said head assembly, said lower arm assembly having one end pivotally connected to said head assembly and having its other end joined to a shaft journalled in said post, said arm assemblies being arranged in spaced, parallel planes so that the head assembly can be moved in substantially a vertical direction; a crank arm for moving said head assembly, said crank arm having a ball-shaped end fitted into a socket formed in said post, and a threaded portion threaded through a bracket carried by said upper arm assembly so that rotation of said crank arm will cause vertical movement of said head assembly; and a counterbalance for said head assembly, said counterbalance comprising a compression spring having one end abutting said upper arm assembly and having its other end abutting said shaft so that the head assembly will be balanced in any position in which it is set by rotation of said crank arm.

6. A bead breaker comprising a base, rollers on said base for rotatably receiving and supporting a tire and wheel in a vertical plane; a post fixed to said base; a head assembly disposed well above a point between said rollers, said head assembly comprising opposed rams and means for actuating said rams; connecting means between said head assembly and said post, said connecting means comprising upper and lower arm assemblies, said upper arm assembly being pivotally connected to said post well above the lever of said rollers and to said head assembly, said lower arm assembly having one end pivotally connected to said head assembly and having its other end joined to a shaft journalled in said post, and said arm assemblies being arranged in spaced, parallel planes so that the head assembly can be moved in substantially a vertical direction; a crank arm for moving said head assembly, said crank arm having a ball-shaped end fitted into a socket formed in said post, and a threaded portion threaded through a bracket carried by said upper arm assembly so that rotation of said crank arm will cause vertical movement of said head assembly; and a counterbalance for said head assembly, said counterbalance comprising a spring pin having one end connected to said upper arm assembly and having its other end slidably received in a hole in said shaft, and a compression spring surrounding said pin, said compression spring having one end abutting said upper arm assembly and having its other end abutting said shaft so that the head assembly will be balanced in any position in which it is set by rotation of said crank arm.

7. A bead breaker comprising a base, rollers on said base for rotatably receiving and supporting a tire and wheel in a vertical plane; a post fixed to said base; a head assembly disposed well above a point between said rollers, said head assembly comprising a tubular, fluid reservoir, opposed ram means including coaxially aligned cylinders secured to each end of said reservoir, a piston rod in each cylinder, a shovel member on the end of each piston rod, fluid connecting means between said reservoir and cylinders, pump means disposed in said fluid connecting means for pumping fluid to said cylinders to extend said ram means to move said shovel members toward each other, and means for retracting the ram means; connecting means between said head assembly and said post, said connecting means comprising upper and lower arm assemblies pivotally connected to said post well above the lever of said rollers and to said reservoir, said arm assemblies being arranged in spaced, parallel planes so that the head assembly can be moved in substantially a vertical direction; a crank arm for moving said head assembly, said crank arm having an end journalled for universal movement in said post, and a threaded portion threaded through a bracket carried by said upper arm assembly so that rotation of said crank arm will cause vertical movement of said head assembly; and a counterbalance for said head assembly, said counterbalance comprising a compression spring, said spring having one end abutting said upper arm assembly and having its other end operatively connected to said post adjacent said lower arm assembly so that the head assembly will be balanced in any position in which it is set by rotation of said crank arm.

8. A bead breaker comprising a base, rollers on said base for rotatably receiving and supporting a tire and wheel in a vertical plane; a post fixed to said base; a head assembly disposed well above a point between said rollers, said head assembly comprising an arcuate, tubular, fluid reservoir having downwardly curved ends, opposed ram means secured to each end of said reservoir and including coaxially aligned cylinders, a piston rod in each cylinder, a shovel member on the end of each piston rod, fluid connecting means between said reservoir and cylinders, pump means disposed in said fluid connecting means for pumping fluid to said cylinders to extend said ram means to move said shovel members toward each other, and springs acting between said cylinders and pistons for retracting the ram means; connecting means between said head assembly and a portion of said post extending well above the lever of said rollers, said connecting means comprising upper and lower arm assemblies, said upper arm assembly being pivotally connected to said post and to said reservoir, said lower arm assembly having one end pivotally connected to said reservoir and having its other end joined to a shaft journalled in said post, and said arm assemblies being arranged in spaced, parallel planes so that the head assembly can be moved in substantially a vertical direction; a crank arm for moving said head assembly, said crank arm having a ball-shaped end fitted into a socket formed in said post, and a threaded portion threaded through a bracket carried by said upper arm assembly so that rotation of said crank arm will cause vertical movement of said head assembly; and a counterbalance for said head assembly, said counterbalance comprising a spring pin having one end connected to said upper arm assembly and having its other end slidably received in a hole in said shaft, and a compression spring surrounding said pin, said spring having one end abutting said upper arm assembly and having its other end abutting said shaft so that the head assembly will be balanced in any position in which it is set by rotation of said crank arm.

References Cited in the file of this patent

UNITED STATES PATENTS

| | | |
|---|---|---|
| 1,119,782 | Landin | Dec. 1, 1914 |
| 1,399,351 | Lee | Dec. 6, 1921 |
| 1,733,936 | Boughton | Oct. 29, 1929 |
| 2,439,896 | Kraft | Apr. 20, 1948 |
| 2,562,995 | Watkins | Aug. 7, 1951 |
| 2,753,924 | Pearne | July 10, 1956 |
| 2,783,830 | Pozerycki et al. | Mar. 5, 1957 |
| 2,795,268 | Branick | June 11, 1957 |
| 2,833,504 | Sacksteder | May 6, 1958 |
| 2,840,143 | Skiles | June 24, 1958 |

UNITED STATES PATENT OFFICE
CERTIFICATE OF CORRECTION

Patent No. 3,051,224                August 28, 1962

Frank S. Pearne

It is hereby certified that error appears in the above numbered patent requiring correction and that the said Letters Patent should read as corrected below.

Column 5, lines 8 and 35, and column 6, lines 2 and 34, for "lever", each occurrence, read -- level --.

Signed and sealed this 11th day of December 1962.

(SEAL)
Attest:

ERNEST W. SWIDER
Attesting Officer

DAVID L. LADD
Commissioner of Patents